(12) United States Patent
McEwen-King (10) Patent No.: US 9,778,097 B2
(45) Date of Patent: Oct. 3, 2017

(54) LOCATION AND MONITORING OF UNDERSEA CABLES

(71) Applicant: OPTASENSE HOLDINGS LIMITED, Farnborough, Hampshire (GB)

(72) Inventor: Magnus McEwen-King, Farnborough (GB)

(73) Assignee: Optasense Holdings Limited (GB)

( * ) Notice: Subject to any disclaimer, the term of this patent is extended or adjusted under 35 U.S.C. 154(b) by 417 days.

(21) Appl. No.: 14/367,366

(22) PCT Filed: Dec. 20, 2012

(86) PCT No.: PCT/GB2012/053210
§ 371 (c)(1),
(2) Date: Jun. 20, 2014

(87) PCT Pub. No.: WO2013/093478
PCT Pub. Date: Jun. 27, 2013

(65) Prior Publication Data
US 2014/0355383 A1    Dec. 4, 2014

(30) Foreign Application Priority Data
Dec. 23, 2011 (GB) .................................. 1122331.0

(51) Int. Cl.
*G01H 9/00* (2006.01)
*G01V 1/38* (2006.01)
(Continued)

(52) U.S. Cl.
CPC ........... *G01H 9/004* (2013.01); *G01V 1/3852* (2013.01); *G02B 6/447* (2013.01); *G02B 6/506* (2013.01);
(Continued)

(58) Field of Classification Search
CPC .... H04B 10/071; H04B 10/85; H04B 10/079; G01H 9/004; G02B 6/447; G02B 6/506;
(Continued)

(56) References Cited

U.S. PATENT DOCUMENTS

| | | | |
|---|---|---|---|
| 4,193,130 A * | 3/1980 | Young et al. | ................. 367/149 |
| 4,956,550 A * | 9/1990 | Edwards et al. | .......... 250/227.15 |
| 5,025,423 A | 6/1991 | Earp | |
| 6,148,123 A | 11/2000 | Eslambolchi et al. | |

(Continued)

FOREIGN PATENT DOCUMENTS

| GB | 2116715 | 9/1983 |
|---|---|---|
| GB | 2206762 | 1/1989 |

(Continued)

*Primary Examiner* — Hovhannes Baghdasaryan
(74) *Attorney, Agent, or Firm* — McDonnell Boehnen Hulbert & Berghoff LLP (57) ABSTRACT

The present application described methods an apparatus for locating and/or monitoring subsea cables (101) having an optical fibre (105) deployed along its length. The optical fibre (105) is connected to a distributed acoustic sensing (DAS) interrogator unit to interrogate the optical fibre to provide a fibre optic DAS sensor. To locate the cable an acoustic stimulus is transmitted into the water from one or more known locations. The time of arrival of an acoustic signal matching the stimulus at the sensing portions of the DAS fibre can be detected and used to determine information about the location of those sensing portions to the known location. The DAS signals returns can also be monitored under ambient conditions to detect any signals indicative of likely damage to the cable.

21 Claims, 3 Drawing Sheets

(51) Int. Cl.
　　　*G02B 6/50*　　　(2006.01)
　　　*G10K 11/00*　　　(2006.01)
　　　*H02G 1/10*　　　(2006.01)
　　　*G02B 6/44*　　　(2006.01)
　　　*H02G 9/02*　　　(2006.01)

(52) U.S. Cl.
　　　CPC ............ *G10K 11/006* (2013.01); *H02G 1/10*
　　　　　　　　　　(2013.01); *H02G 9/02* (2013.01)

(58) Field of Classification Search
　　　CPC .......... G01V 1/3852; H02G 1/10; H02G 9/02;
　　　　　　　　　　　　　　　　　　G10K 11/006
　　　See application file for complete search history.

(56) References Cited

U.S. PATENT DOCUMENTS

| | | | |
|---|---|---|---|
| 8,009,983 B2 * | 8/2011 | Zhang | .............................. 398/37 |
| 2006/0225507 A1 | 10/2006 | Paulson | |
| 2007/0264012 A1 | 11/2007 | Healey et al. | |
| 2011/0141853 A1 * | 6/2011 | Megdal et al. | ............... 367/117 |
| 2011/0194107 A1 | 8/2011 | Hartog et al. | |
| 2013/0151203 A1 * | 6/2013 | McEwen-King | ....... G06F 17/00 |
| | | | 702/189 |

FOREIGN PATENT DOCUMENTS

| | | |
|---|---|---|
| WO | WO 2004/102840 | 11/2004 |
| WO | WO 2008/073033 | 6/2008 |
| WO | WO 2010/091404 | 8/2010 |
| WO | WO 2011/058312 | 5/2011 |
| WO | WO 2011/058313 | 5/2011 |

* cited by examiner

LOCATION AND MONITORING OF UNDERSEA CABLES

FIELD OF INVENTION

The present invention relates to method and apparatus for locating and/or monitoring undersea cables using distributed acoustic sensing.

BACKGROUND OF THE INVENTION

Undersea or submarine cables are used for a variety of purposes, most notably for carrying telecommunications data but also in some instances for carrying power. Most modern telecommunications cables are fibre optic cables and very long lengths of fibre optic cable may be used to carry large amounts of data.

Typically such subsea cables are deployed by deployed from a reel on a boat travelling on a desired route between the two land locations which the cable is connecting. The location of the boat is tracked as the cable is deployed so that a record of the path of the cable can be maintained.

A record of the path of the cable can be useful for several reasons. Submarine cables can be damaged or broken through the action of ships dropping or raising anchors onto the cable. Also cables can be entangled in the nets of fishing boats or the like. Such breakages can cause major outages in the services being delivered by the cables and can be very costly to repair. Thus in some instances it may be desired to designate areas around the path of the cable as areas where certain activities are restricted, e.g. no fishing areas or no anchoring zones.

Even with the precautions mentioned above breakages or damage can occur. Earthquakes have been known to damage cables, as have interaction of marine life, e.g. shark bites, or drifting objects such as submerged logs or abandoned anchors or the like. General movement of the cable, for instance due to tides or ocean currents can also cause abrasion of the cable against rocky parts of the sea bed leading to eventual damage or breakage. When such breakages occur the cable needs to be repaired and it is usual to splice a new section into the cable to replace the damaged or broken section. Clearly this involves locating the relevant section of fibre. In the case of a broken fibre optic cable the distance along the fibre optic can be determined by transmitting a pulse of light into the fibre and timing the return trip time for reflection from the broken end of the fibre. However it is necessary to know the path of the cable to locate the actual section of damaged cable.

Finally when planning laying of new cables it is useful to know the path of existing cables—either to allow different routing for deliberate redundancy or to allow the same path to be followed, for instance to reduce the area of the restricted zones described above.

As mentioned above the location of the ship deploying the cable may be plotted when laying the cable. However the cable may drift before settling on the seabed and thus the plotted location may not correspond to the actual cable location. Further the location of the cable may drift over time due to ocean currents or the like.

Also for some older cables there may be no existing plot of the exact path that the cable was laid on or it may be inaccurate.

It would therefore be useful to be able to accurately determine the location of subsea cables, at least in the relatively near vicinity of the shore where the risk of damage due to shipping activity is highest.

Also, as mentioned above damage to the cable may occur when motion of the cable due to normal tidal activity or oceans currents or the like causes the cable to rub against part of the sea floor. This can particularly be the case if the cable is running over a relatively rocky part of the seabed and makes contact at only a few points, i.e. the abrasion of the cable in concentrated in one spot. This may occur if the cable is deployed over a ridge in the rock of the seabed.

In some instances a different deployment of the cable would greatly reduce the amount of wear and tear experienced by the cable and thus provide an extended lifespan before damage or repair. Inspecting the deployment of the cable can however be a time consuming and expensive task involving divers or submersibles.

It would therefore also be useful to be able to monitor the cable for indicators of likely damage.

SUMMARY OF THE INVENTION

Thus according to the present invention there is provided a method of locating a cable deployed within a body of water comprising interrogating a first optical fibre deployed along the length of said cable to provide a distributed acoustic sensor comprising a plurality of longitudinal sensing portions of fibre; transmitting an acoustic stimulus into the body of water from at least one known location, and processing the returns from the distributed acoustic sensor from the plurality of longitudinal sensing portions of fibre to determine the location of the fibre.

The method of this aspect of the present invention uses the principles of distributed acoustic sensing (DAS). Distributed acoustic sensing is a known type of sensing where an optical fibre is deployed as a sensing fibre and interrogated with electromagnetic radiation. Radiation which is backscattered from within the optical fibre is detected and analysed to reveal information about acoustic stimuli acting on the optical fibre in different longitudinal sections of the sensing fibre, i.e. channels. Thus the DAS sensor effectively acts as a linear sensing array of sensing portions of optical fibre. The length of the sensing portions of fibre is determined by the characteristics of the interrogating radiation and the processing applied to the backscatter signals but typically sensing portions of the order of a few meters to a few tens of meters or so may be used. Note as used herein the term acoustic shall mean any type of pressure wave or mechanical disturbance that may result in a change of strain on an optical fibre and for the avoidance of doubt the term acoustic be taken to include ultrasonic and subsonic waves.

By using a fibre optic which is deployed along the length of the cable to be located as a DAS sensor it is possible to use the acoustic signals detected by the DAS sensor in response to an acoustic stimulus from at least one known location to determine information about the location of the cable.

The acoustic stimulus may be one or more acoustic pulses, i.e. an acoustic stimulus with a defined start and finish. Determining the relative time of arrival of the acoustic stimulus at the various different portions of the optical fibre will reveal the relative distance between that portion of the optical fibre and the source of the acoustic stimulus. Determining the absolute time taken for the acoustic stimulus to travel from the source to each sensing portion can be used to determine the actual distance between the source and the relevant sensing portion which can be used to determine the location of the cable.

In some instances, if the general position of the cable is known it may be sufficient to use an acoustic stimulus which is transmitted from only one known location. For instance if it is know that the cable runs generally north-south and the depth of the seabed is known in that area then transmitting a signal from a location which is known to be one side of the cable, say to the east, may be sufficient to locate the cable. However in many situations it will be desirable to transmit an acoustic stimulus from a plurality of different known locations.

By comparing the travel time for the acoustic stimulus to reach the sensing portions of optical fibre from the various different known locations the relative distances from the known locations to the sensing portions of the optical fibre can be determined.

Multilateration type techniques can be used to determine the cable location. It is noted however that multilateration is typically used in sensors where the position of multiple sensors is known and the position of the transmitter is unknown. The method of the present invention involves an unknown location of each sensing portion of fibre but with known positions for the sources.

The method may assume that the average speed of sound within the body of water along a path from a first known location to a sensing portion of optical fibre is the same as from a second known location. This may be largely true for locations that are relatively close together. Although for locations that are further apart differences in temperature profile, salinity etc. may affect the local speed of sound the effect will not be large and will only result in a small error in determining the location. The speed of sound in the vicinity of each known location may be estimated or could be measured used any known technique for measuring the speed of sound.

To avoid significant changes in conditions leading to large changes in the average speed of sound the measurements may be collected within a relatively short period, for instance a few hours. In other words the time between transmitting a first acoustic stimulus from a first known location and transmitting a second acoustic stimulus from a second known location may be within a few hours. For example a ship, or any other suitable vessel, may traverse an area where the cable in deployed and may transmit an acoustic stimulus at each of a plurality of different locations during the traversal. By processing the time difference between transmitting the acoustic signal and its detection at a sensing portion of the optical fibre for each of the different transmit locations the location of the sensing portion of fibre can be determined.

In this embodiment if the ship transmits an acoustic stimulus from a position which is nearly directly overhead the cable the relevant sensing portion of fibre directly under the transmit location will exhibit the shortest travel time between transmitting and detecting the acoustic signal. Thus if it is known that at least one transmit location is likely to be nearly directly overhead the cable the measurements can be analysed to determine the shortest transit time between transmission and detection of the signal and this can be identified as corresponding to a location nearly overhead the cable. In this instance the transit time may be taken to be mainly downwards transmission and thus the transit time can be used to determine information about the depth of the cable.

Thus the method may involve plotting a course and a series of transmit locations that will ensure that at least one location is likely to be nearly overhead the cable. Data from the cable could be acquired and stored as the ship or other vessel traverses its path and then analysed to determine the shortest transit time. In some embodiments however data from the DAS sensor may be analysed in real time and communicated to the ship or other vessel. For instance if a cable is assumed to lie in a generally north-south direction a vessel could approach the region in which the cable is thought to lie travelling generally east-west whilst transmitting suitable acoustic stimuli at regular intervals, say every few hundred meters or whatever accuracy is required. The transit time for the acoustic stimulus to be detected by the sensing fibre could be determined and communicated to the vessel. If the transmit time reduces between subsequent transmissions it can be taken that the cable is closer to the most recent location than the previous location. However once the transmit time increases between subsequent transmissions it can be taken that the cable is further away from the most recent location than the previous location. This data could be used to determine a course for the vessel to track the location of the cable.

It will of course be appreciated that the DAS sensor transmits light into the end of the fibre optic deployed along the length of the cable and thus will typically located in a fixed location on land. However data could be transmitted to the survey vessel via radio communication.

It should also be noted that the vessel which transmits the acoustic signal need not be a dedicated survey vessel. For instance certain vessels such as coastguard vessels or the like or even fishing vessel could be equipped with suitable transmitters arranged to periodically transmit an acoustic stimulus. If the DAS interrogator is connected to the optical fibre deployed along the cable then data may be acquired.

In this instance the acoustic stimulus transmitted by a vessel could be unique to that vessel, i.e. each vessel could transmit a stimulus which is a coded series of acoustic pulses. Detection of a series of acoustic pulses by the sensing channels of the DAS sensor can therefore be analysed to determine the coding of the pulses. This could be used to determine the vessel from which the acoustic stimuli are being transmitted.

The acoustic stimuli from different locations could also be transmitted from different platforms. For instance more than one vessel could be used to survey the cable location and to transmit acoustic stimuli from different known locations. Additionally or alternatively one or more buoys or other fixed structures in known locations could be arranged to transmit acoustic stimuli. In this embodiment the stimuli could be transmitted sequentially or simultaneously. In order to distinguish the stimuli, especially when transmitting simultaneously or near simultaneously, the stimuli could be transmitted at different acoustic frequencies or with different pulse lengths, or spacings etc.

In order to determine the transit time it is clearly necessary to know the time at which the acoustic stimulus is transmitted and the time at which it is detected. The transmit location and DAS sensor may therefore be synchronised to accurate clocks and/or synchronised a GPS time signal or similar. The data recorded by the DAS sensor may therefore be given a GPS based time stamp and the transmitter may operate at predetermined times as determined by a GPS signal or similar.

It is also obviously necessary to determine the location of the source of the acoustic signal. Again this may be readily accomplished by GPS but in other embodiments the source may be located on a fixed structure of known location such as an oil rig or the like.

The source of the acoustic stimuli may be any acoustic source suitable for transmitting an acoustic stimulus into the body of water. Whilst a loudspeaker outside of the water could be used to transmit the acoustic stimulus it may be desirable to use an underwater acoustic source which is designed for transmitting acoustic waves into water. The acoustic source may be submerged and may be deployed just under or near the surface of the water. In some embodiments the depth of the acoustic source may be changed between transmissions of acoustic stimuli or there may be more than one acoustic source arranged at different depths. Thus a first stimulus may be transmitted from a given location from just under the surface and another stimulus may be transmitted from the same location in the horizontal plane but at a different depth.

To determine useful information from transmission at different depths there should preferably be a relatively large difference in depth between the source of the transmission, of the order of a few hundred metres or so. This could lead to difficulties in accurately positioning the source in the same horizontal position but again depending on the accuracy required this may not be significant.

As mentioned above the one or more sources of acoustic stimuli will therefore be located on or in the body of water whereas the DAS interrogator will be located at the end of the optical fibre which is deployed along the length of the cable.

The acoustic source may transmit the acoustic stimuli at a frequency and intensity level that is such that the signal can be detected by the DAS sensor but with regard to the local marine life and local environmental conditions.

In some instances the DAS sensor could be permanently arranged to provide DAS sensing on an optical fibre deployed along the fibre. This can allow regular location of the cable, especially using acoustic transducers mounted on buoys or the like. Permanent DAS sensing can also provide useful monitoring about any disturbances acting on the cable which may be likely to lead to damage as will be discussed in more detail below.

In other instances the DAS interrogator could be connected only periodically, for instance when a suitable survey vessel equipped with a suitable acoustic source is in the area, in order to survey the location of the cable.

The cable may be a fibre optic cable such as used for telecommunications and the optical fibre may therefore be one of a bundle of fibres of such a cable. The optical fibre may be one which otherwise is used for data communications or may be a currently spare fibre included for redundancy purposes.

Alternatively the cable may be a cable to which an optical fibre has been added just for the purposes of allowing DAS sensing on the cable to determine location and/or monitoring. Thus for instance an optical fibre could be included in a power cable or the like, which may not typically include an optical fibre.

Another aspect of the present invention therefore relates to the inclusion of an optical fibre during manufacture of a subsea cable which is not a fibre optic communications cable. The cable may be a subsea power cable. The invention also extends therefore to a subsea power cable comprising an optical fibre.

As described above DAS can be useful be used with optical fibre to provide sensing capability along a length of about 40-50 km of optical fibre. Thus it will be appreciated that for cable lengths of hundreds of kilometres such as stretch across seas and oceans it will not be possible to monitor the whole length of the cable.

However the need to determine the cable location so as to avoid damage from ship anchors or fishing vessels only applies to any significant degree to coastal waters, or in large lakes or the like. In the deep ocean fishing activity and normal shipping is unlikely to impact on the cable. Thus a range of 40-50 km off-shore will be sufficient in most instances.

The present invention also relates to a method of monitoring a subsea cable to detect possible damage. Thus according to another aspect of the invention there is provided a method of monitoring a cable deployed within a body of water comprising interrogating a first optical fibre deployed along the length of said cable to provide a distributed acoustic sensor comprising a plurality of longitudinal sensing portions of fibre; and processing the returns from the distributed acoustic sensor from the plurality of longitudinal sensing portions of fibre to determine repeated instances of disturbances at the same sensing portion of optical fibre.

The method of this aspect of the invention thus uses DAS sensing to monitor the returns from the various sensing portions of fibre and processes the returns to detect any instances of repeated disturbance at the same sensing portion.

As described previously a subsea cable which has been deployed may not stay in one location and may move with the tide or with ocean currents or the like. As the cable is moved the outside of the cable will be moved across the seabed. In some instances this may involve the cable being dragged across an abrasive or sharp section of rock or coral or the like. Movement of the cable across such an environment may cause abrasion of the outside of the cable, which may eventually lead to damage or failure.

Any significant rubbing or scraping of the outside of the cable against the underlying material will tend to lead to mechanical vibration of the cable/an acoustic disturbance at that point. Such vibration/acoustic disturbance can be detected by a sensing portion of the DAS sensor.

An occasional or one-off disturbance detected at a given sensing portion of sensing fibre is not likely to be a cause for concern. Such a disturbance could occur for a variety of reasons, such as resettling of the cable to a location where less movement is possible or interaction with marine life. However if there is a repeated disturbance from the same sensing portion of optical fibre over time this could be indicative of continually abrasion of the cable. If such a repeated signal is detected this could be used to trigger and investigation and/or movement of the cable. For instance a diver or submersible vehicle could be sent to inspect the cable at the location indicated by the relevant sensing portion. If it looks like the cable is being damaged it could be relocated away from that part of the seabed to a part where less damage may occur.

Alternatively it may be simpler to drag the cable off the seabed in that location and move it to a different part and release. The cable will then settle to a new location and can be further monitored. If there is no significant disturbance repeatedly affecting the cable in the new location it may then be left there permanently.

The method of monitoring a subsea cable may therefore be performed continually or may be performed periodically, perhaps combined with a survey to determine the current location of the cable as described previously. Additionally or alternatively the method may be performed when a new cable is laid. The DAS sensor could be monitored for a set period following a new deployment to determine any likely problems.

By detecting possible damage of the cable before the damage becomes severe the costs of repair and issues of loss of service due to breakage can be avoided.

DESCRIPTION OF THE DRAWINGS

The invention will now be described by way of example only with reference to the following drawings, of which.

DESCRIPTION OF THE INVENTION

Figure 1:
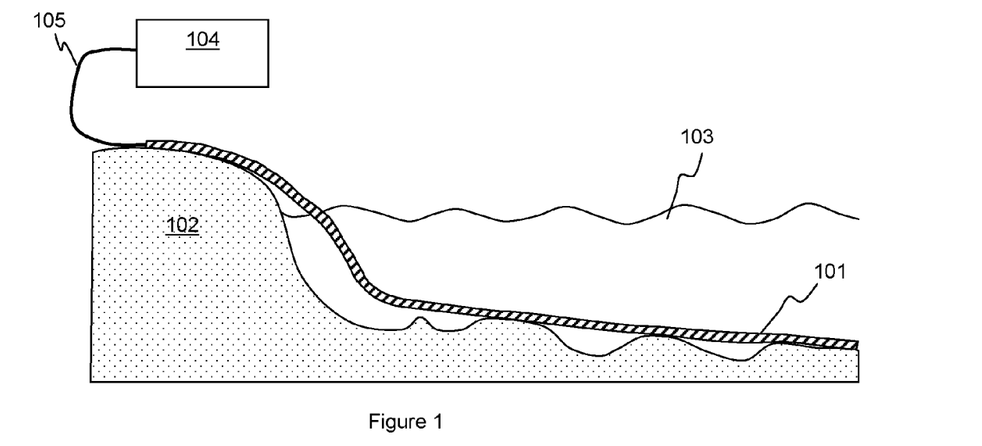
FIG. 1 illustrates a subsea cable having an optical fibre arranged to provide DAS sensing.

FIG. 1 illustrates a subsea or submarine cable 101 which runs from on land 102 into a body of water 103 which will typically be a sea or ocean but in some instance could be a lake or any other large body of water. The cable includes an optical fibre 105 which is arranged to run along the length of the cable, conveniently within the protective sheath of the cable. The cable may be a telecommunications cable and thus optical fibre 105 may be one of the bundle of optical fibres which may be used for telecommunications. In other embodiments however the cable may be an electrical cable, for instance for subsea power transmission in which case the optical fibre 105 may have been deliberately introduced. As mentioned the optical fibre is preferably located within the outer casing of cable 101 as shown but in some embodiments the optical fibre may be disposed in a separate fibre optic cable which is attached to the cable 101.

The optical fibre 105 emerges from the end of the cable 101 on land and may be connected to a DAS interrogator 104, however in other embodiments the optical fibre 104 may be extracted from the cable at an earlier point, before the end of the cable.

The DAS interrogator 104 is configured to provide distributed acoustic sensing (DAS) on the optical fibre 105 which acts as a sensing fibre.

In operation the interrogator 104 launches interrogating electromagnetic radiation, which may for example comprise a series of optical pulses having a selected frequency pattern, into the sensing fibre 105. The optical pulses may have a frequency pattern as described in GB patent publication GB 2,442,745, the contents of which are hereby incorporated by reference thereto. Note that as used herein the term "optical" is not restricted to the visible spectrum and optical radiation includes infrared radiation and ultraviolet radiation. Backscattering results in some fraction of the light input into the fibre being reflected back to the interrogator, where it is detected to provide an output signal which is representative of acoustic disturbances in the vicinity of the fibre. In one embodiment the detector is arranged to detect radiation which has been Rayleigh backscattered within said fibre, but other types of distributed acoustic sensor using other types of backscatter are known.

Figure 2:
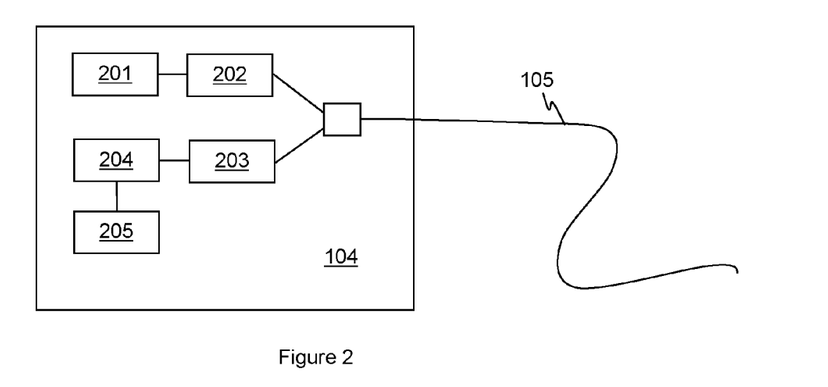
FIG. 2 illustrates a typical DAS sensor.

Referring to FIG. 2 the interrogator therefore comprises at least one laser 201 and at least one optical modulator 202 for repeatedly producing at least two optical pulses which are separated by a known optical frequency difference. The interrogator also comprises at least one photodetector 203 arranged to detect radiation which is Rayleigh backscattered from the intrinsic scattering sites within the fibre 102.

The signal from the photodetector 203 is sampled and processed by processor 204. The processor conveniently demodulates the returned signal, for example based on the frequency difference between the optical pulses. The phase of the backscattered light from various sections of the optical fibre can therefore be monitored. Any changes in the effective path length from a given section of fibre, such as would be due to incident pressure waves causing strain on the fibre, can therefore be detected.

The form of the optical input and the method of detection allow a single continuous fibre to be spatially resolved into a plurality of discrete longitudinal sensing portions. That is, the acoustic signal sensed at one sensing portion can be provided substantially independently of the sensed signal at an adjacent portion. Such a sensor may be seen as a fully distributed or intrinsic sensor, as it uses the intrinsic scattering processed inherent in an optical fibre and thus distributes the sensing function throughout the whole of the optical fibre. The spatial resolution of the sensing portions of optical fibre may, for example, be approximately 10 m or less, which for continuous length of fibre of the order of 40 km or more. Thus sensing fibre 105 may be divided into at least 4000 independent acoustic channels or so deployed along a length of the cable 101 of the order of 40 km or so.

The sensing fibre may be a standard, unmodified single mode optic fibre such as is routinely used in telecommunications applications without the need for deliberately introduced reflection sites such a fibre Bragg grating or the like. The ability to use an unmodified length of standard optical fibre to provide sensing means that low cost readily available fibre may be used and DAS may be employed on existing telecommunications cables. However in some embodiments where an optical fibre is specifically introduced to allow for DAS sensing such a fibre could be one which has been fabricated to be especially sensitive to incident vibrations.

Referring back to FIG. 1 the interrogator 104 therefore interrogates optical fibre 105 in such a way as to turn it, and hence cable 101, into an acoustic detector.

In one embodiment this can be used to help determine the location of the cable. Typically the cable is deployed by ship and although the path of general deployment may be plotted the cable may drift before reaching the seabed and may drift over time due to ocean currents or the like.

As mentioned above knowing the location of the cable can be important for two main reasons. First to avoid damage or breakage of the cable by shipping activity, such as raising and lowering or anchors or fishing activity it may be useful to indicate the area where the cable lies and to restrict dangerous activities in that area. Second in the event of a breakage or significant damage the cable will be repaired by splicing a new section to replace the damaged section. However clearly this requires to ability to find the damaged section.

Conventionally it can be difficult to locate the cable short of sending divers or submersibles to search for the cable or dragging the seabed in the general area where the cable is expected to be.

Embodiments of the present invention use DAS on the optical fibre 105 to determine the location of the cable, at least in the 40 km of so near to shore. It is this part of the cable which is most prone to breakages due to shipping activity and thus knowing the location of the first 40 km or so of cable may be sufficient.

In this embodiment of the invention the DAS interrogator 104 is used to monitor the acoustic signals detected by the sensing fibre 105 when at least one acoustic stimulus is transmitted into the water from at least one known location.

Figure 3A:
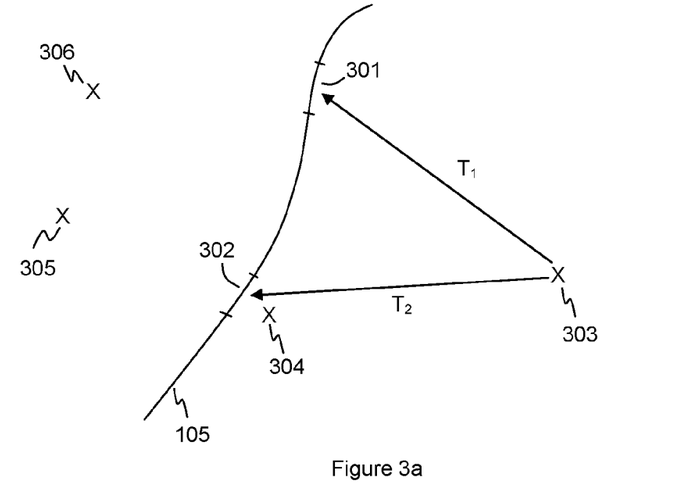
FIGS. 3a and 3b illustrates a method of locating a subsea cable according to the present invention.
Figure 3B:
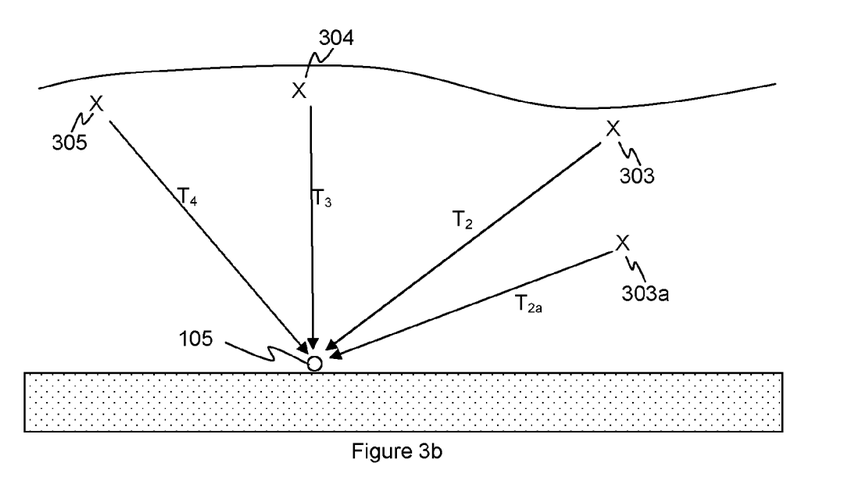

FIG. 3 illustrates the method of the invention. FIG. 3a illustrates in plan view the path of the cable and optical fibre 105 on the sea bed. FIG. 3b shows the same arrangement in cross-section. As described the DAS interrogator acts so that sensing fibre has a plurality of longitudinal sensing portions such as 301 and 302. These sensing portions are able to independently determine any acoustic signals acting on that section of the optical fibre.

Thus at a first time an acoustic stimulus is transmitted into the water at a first known location 303. The acoustic stimulus may be a pulse or series of pulses or any acoustic signal which is readily identifiable and which has a clearly defined start and/or end or other identifiable acoustic transition which is narrowly defined in time. The acoustic signal is either sent at a predefined time with respect to an accurate clock or the time of that the acoustic stimulus is transmitted is recorded. In one arrangement the acoustic source is provided with a clock based on a GPS signal (or other suitable broadcast timing/location signal) to provide an accurate indication of the time at which the signal is transmitted. A GPS sensor in the acoustic source can also be used to provide an indication of the location.

The returns from the DAS sensor are processed (either in real time or later) to determine whether the acoustic stimulus is detected by any of the sensing portions of optical fibre and, if so, when the signal was detected. The time of arrival of the signal at the various sensing portion of fibre can be determined and (based on knowledge of when the signal was transmitted) also the time taken for the signal to travel from the location 303 to the sensing portions, e.g. 301 and 302, i.e. time periods $T_1$ and $T_2$ respectively. The DAS interrogator is thus also synchronised to an accurate clock and the interrogator may comprise a GPS unit 205 to time stamp the acquired data, i.e. provide a GPS lock.

By determining the time taken for the signal to travel to the various sensing portions and taking an estimated or measured value for the speed of sound in the water the distance between the first location 301 and the sensing portions 301 and 302 may be calculated. In some instances, if the general path of the cable and depth of the seabed is known that may be sufficient to determine the location of the cable. For instance looking at FIG. 3a it can be seen that from location 303 the sensing portions 301 and 302 are about equidistant from the first location 303. Thus the time of travel of the acoustic signal to both these locations will be about the same. If the depth of the cable is known the horizontal distance from the first location can be calculated and thus the general path of the cable plotted.

In most instances however it will be necessary to transmit signals from a plurality of different locations. Thus FIG. 3 illustrates various locations from which acoustic stimuli may be transmitted, i.e. locations 303, 304, 305 and 306.

In some arrangements separate acoustic sources could be located at each location and arranged to transmit acoustic stimuli in a sequence. Alternatively at least some acoustic stimuli could be transmitted simultaneously and distinguished from one another by using different acoustic frequencies and/or different encodings, i.e. different pulse lengths and/or spacing between pulses. At least some of the acoustic sources could be located on fixed buoys or other platforms.

In another embodiment however the acoustic stimuli may be transmitted by one or more vessels which traverse the area in which the cable is deployed to provide surveying. For instance a single vessel could travel to locations 301, 302, 303 and 304 in sequence transmitting a stimulus at each location. The pattern of travel and interval between transmitting can be chosen according to the desired accuracy.

By obtaining the times of travel of the acoustic stimulus from a plurality of known locations to a given sensing portion the location of that sensing portion can be determined.

It will be noted that the various locations illustrated in FIG. 3 include a location 304 which is almost directly overhead sensing portion 302. It will be appreciated therefore that the time of travel $T_3$ from location 304 to sensing portion 302 will be the shortest time of travel recorded and the times of travel, $T_2$ and $T_4$ from the neighbouring locations 303 and 305 will be longer. This can be used to determine the position of closest approach to the relevant sensing portion and it may be possible to determine that the relative sensing portion therefore lies underneath location 304. In this case the time of travel $T_3$ can be used to determine the depth directly.

Using this comparative approach to whether the time of travel has increased or decreased can be used in real time to direct the path of a vessel conducting the survey, if the data from the interrogator 104 can be sent to the vessel, for instance via radio or satellite link.

The acoustic stimulus may conveniently be transmitted by an in-water acoustic transducer which may be located just under the surface of the water. An in-water transducer is preferred to get the best acoustic coupling but an above surface loudspeaker could be used if desired. Instead of a specific acoustic transducer some other noise generating component could be operated in a specific sequence—for instance a ships engine could be modulated according to a desired sequence—however an acoustic transducer tends to provide the sharpest ramp up and ramp down of the acoustic signal and is easily controlled at precise times.

The acoustic source does not have to be located at the surface and as shown in FIG. 3b at least one location 303a could be located at a set depth into the water. The use of an acoustic source at a different depth can help provide depth resolution, but only if the source is located at a significant depth.

The method of the present invention therefore allows a method of determining relatively precise locations of subsea cables in situ by monitoring an optical fibre deployed in the cable in response to acoustic stimuli.

The use of DAS can also provide benefits in terms of health monitoring of subsea cables.

Figure 4A:
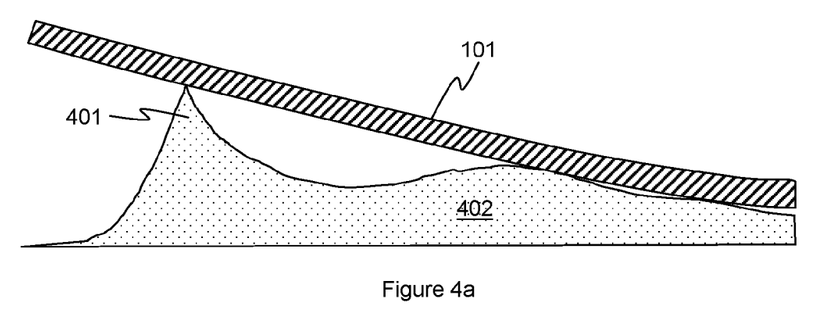
FIGS. 4 and 4b illustrate a method of monitoring a subsea cable to detect possible damage.

As mentioned above a cable which has been deployed may move due to ocean currents, tidal actions etc. In some instances the cable may be constrained from moving, for instance located in a crevice, but in general the cable may be free to move. As the cable moves it will rub along the seabed on which it lies. This rubbing may result in abrasion of the outside of the cable and may eventually result in damage of failure. This may particularly be the case where the cable lies on a sharp or jaded ridge for example as shown in FIG. 4a where cable 101 lies over sharp protrusion 401 on the sea bed and also on flat sea bed 402. Movement of the cable from side to side may not be much of a problem but where the cable runs across promontory 401 the rock bed may cut into the cable, resulting in eventual failure.

Once a cable has failed it will need to be repaired which can be a costly and time consuming exercise and the failure may result in loss of service. However if advance warning of damage to the cable can be detected it may be possible to plan for scheduled repair and thus avoid loss of service or, by moving the cable to a different location which is less abrasive or by fixing the cable to prevent movement, further damage may be prevented.

Figure 4B:
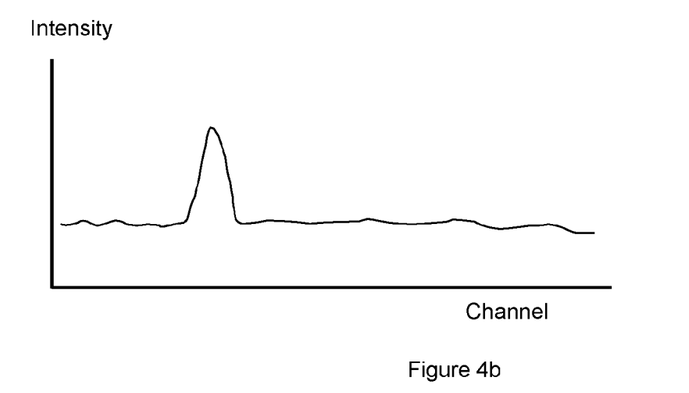

Thus in this embodiment of the invention the returns from the DAS sensor from the cable are monitor under ambient conditions. Areas where the cable undergoes heavy abrasion may be detected by detecting increased acoustic activity. For instance the rubbing of cable 101 against promontory 401 will lead to an acoustic signal at the relevant acoustic channel as indicated by intensity peak 403 in FIG. 4b.

The DAS sensor may therefore be monitored over time to detect any channels which exhibit continually or repeated relatively high intensity returns. If such a return is detected over a period of time this could be indicative of damage to the cable. An investigation may therefore be conducted or steps taken to relocate the cable or prevent movement in that area.

The monitoring may be conducted continuously or periodically but may especially be useful for newly laid cable to detect any possible future problems.

The invention claimed is:

1. A method of locating a cable deployed within a body of water comprising:
   interrogating a first optical fibre deployed along the length of said cable to provide a distributed acoustic sensor comprising a plurality of longitudinal sensing portions of fibre;
   transmitting an acoustic stimulus into the body of water from a plurality of different known locations, and
   processing the returns from the distributed acoustic sensor from the plurality of longitudinal sensing portions of fibre to determine the location of the fibre by determining the relative time of arrival of the acoustic stimulus at the various sensing portions of the optical fibre.

2. A method as claimed in claim 1 wherein the acoustic stimulus comprises one or more acoustic pulses.

3. A method as claimed in claim 1 comprising determining the absolute time taken for the acoustic stimulus to travel from the known location to each sensing portion of optical fibre.

4. A method as claimed in claim 1 comprising the step of measuring the speed of sound in the vicinity of at least one location and using said measured speed of sound to determine the location of the fibre.

5. A method as claimed in claim 1 wherein at least one vessel traverses an area where the cable is deployed and transmits an acoustic stimulus at each of a plurality of different locations during the traversal.

6. A method as claimed in claim 5 comprising determining a location in which the travel time between transmitting and detecting the acoustic signal is the shortest.

7. A method as claimed in claim 5 comprising plotting a course for said vessel and a series of transmit locations that will ensure that at least one location is likely to be nearly overhead the cable.

8. A method as claimed in claim 7 wherein data from the distributed acoustic sensor is communicated to the vessel in real time.

9. A method as claimed in claim 8 wherein the data from the distributed acoustic sensor is used to determine a course for the vessel to track the location of the cable.

10. A method as claimed in claim 1 wherein acoustic stimuli from different locations are transmitted from different platforms.

11. A method as claimed in claim 10 wherein one or more buoys or fixed structures in known locations are arranged to transmit acoustic stimuli.

12. A method as claimed in claim 10 wherein the acoustic stimuli are (i) transmitted sequentially or (ii) transmitted simultaneously and are transmitted at different acoustic frequencies and/or with different pulse encodings.

13. A method as claimed in claim 1 wherein a transmit location and distributed acoustic sensor are synchronized to an accurate clock signal.

14. A method as claimed in claim 13 wherein (i) said accurate clock signal comprises a GPS clock signal or (ii) the data recorded by the distributed acoustic sensor is given a GPS based time stamp.

15. A method as claimed claim 1 wherein the acoustic stimulus is transmitted using an underwater acoustic source which is designed for transmitting acoustic waves into water.

16. A method as claimed in claim 15 where the acoustic source is submerged and deployed just under or near the surface of the water.

17. A method as claimed in claim 15 wherein the depth of the acoustic source is changed between transmissions of acoustic stimuli and/or there is more than one acoustic source arranged at different depths.

18. A method as claimed in claim 1 wherein the cable is a fibre optic cable used for telecommunications.

19. A method as claimed in claim 1 wherein the cable is a cable to which an optical fibre has been added for the purposes of allowing DAS sensing on the cable to determine location and/or monitoring.

20. A method as claimed in claim 19 wherein the cable is a power cable.

21. A method as claimed in claim 1 further comprising processing the returns from the distributed acoustic sensor from the plurality of longitudinal sensing portions of fibre to determine repeated instances of disturbances at the same sensing portion of optical fibre which are not due to said acoustic stimulus.

* * * * *